Aug. 28, 1951   J. W. ARMSTRONG ET AL   2,565,940
TUBE-BENDING APPARATUS
Filed Aug. 27, 1949   15 Sheets-Sheet 1
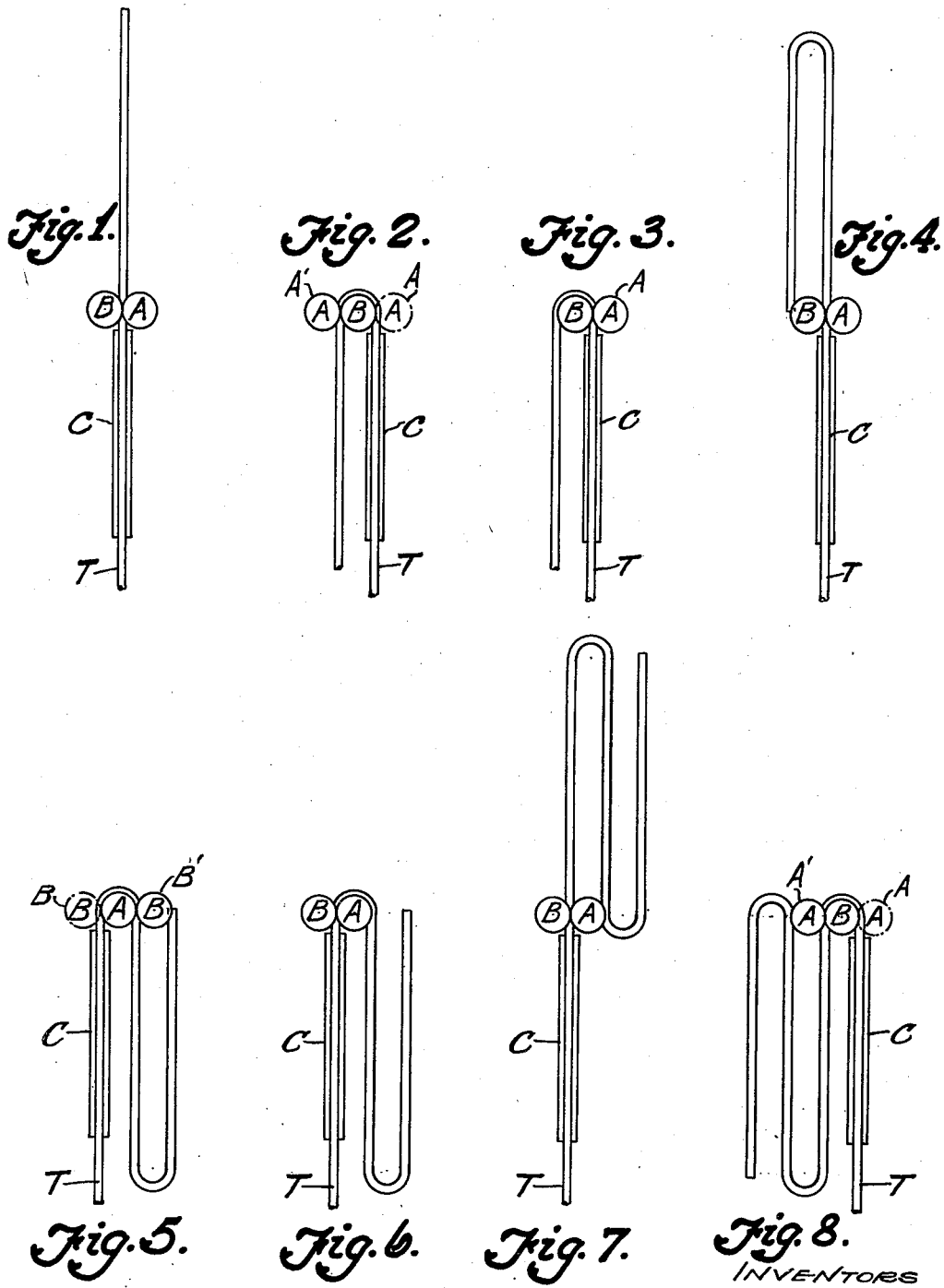
INVENTORS
BERNARD E. FRANK
& JOHN W. ARMSTRONG
BY
THEIR ATTORNEYS

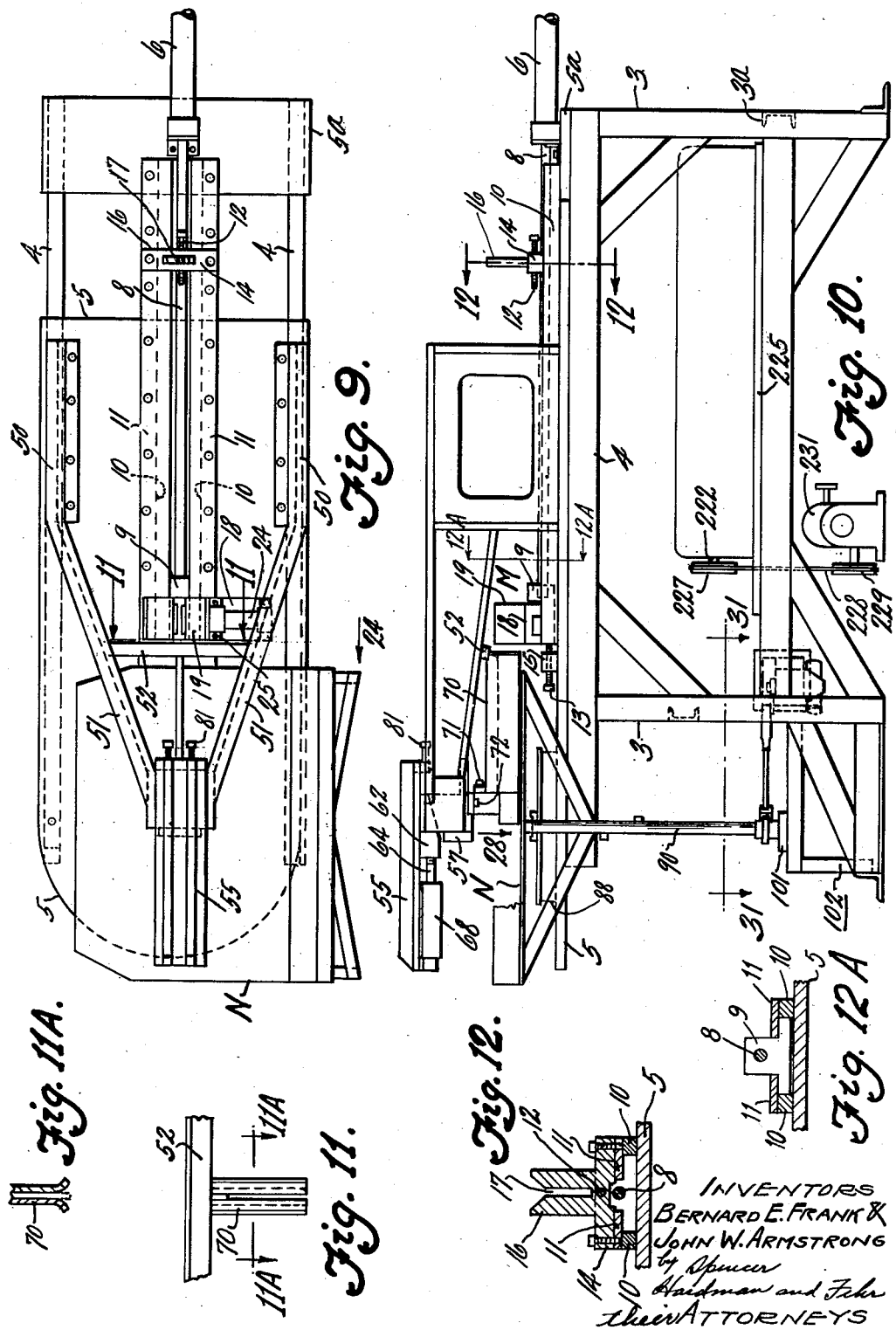

Aug. 28, 1951  J. W. ARMSTRONG ET AL  2,565,940
TUBE-BENDING APPARATUS
Filed Aug. 27, 1949  15 Sheets-Sheet 3

INVENTORS
BERNARD E. FRANK
& JOHN W. ARMSTRONG
BY Spencer Hardman & Fisher
their ATTORNEYS

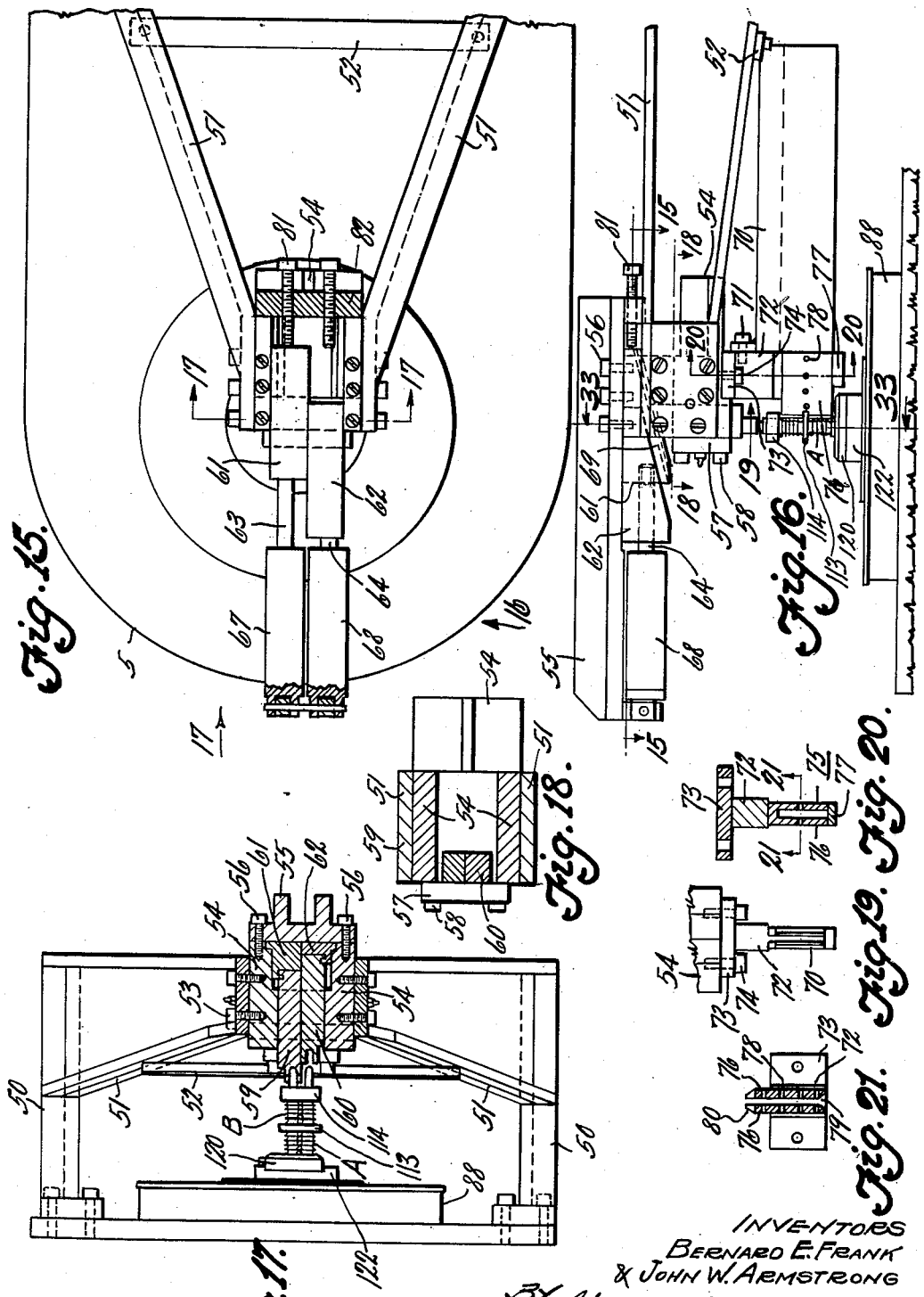

Aug. 28, 1951  J. W. ARMSTRONG ET AL  2,565,940
TUBE-BENDING APPARATUS
Filed Aug. 27, 1949  15 Sheets-Sheet 5
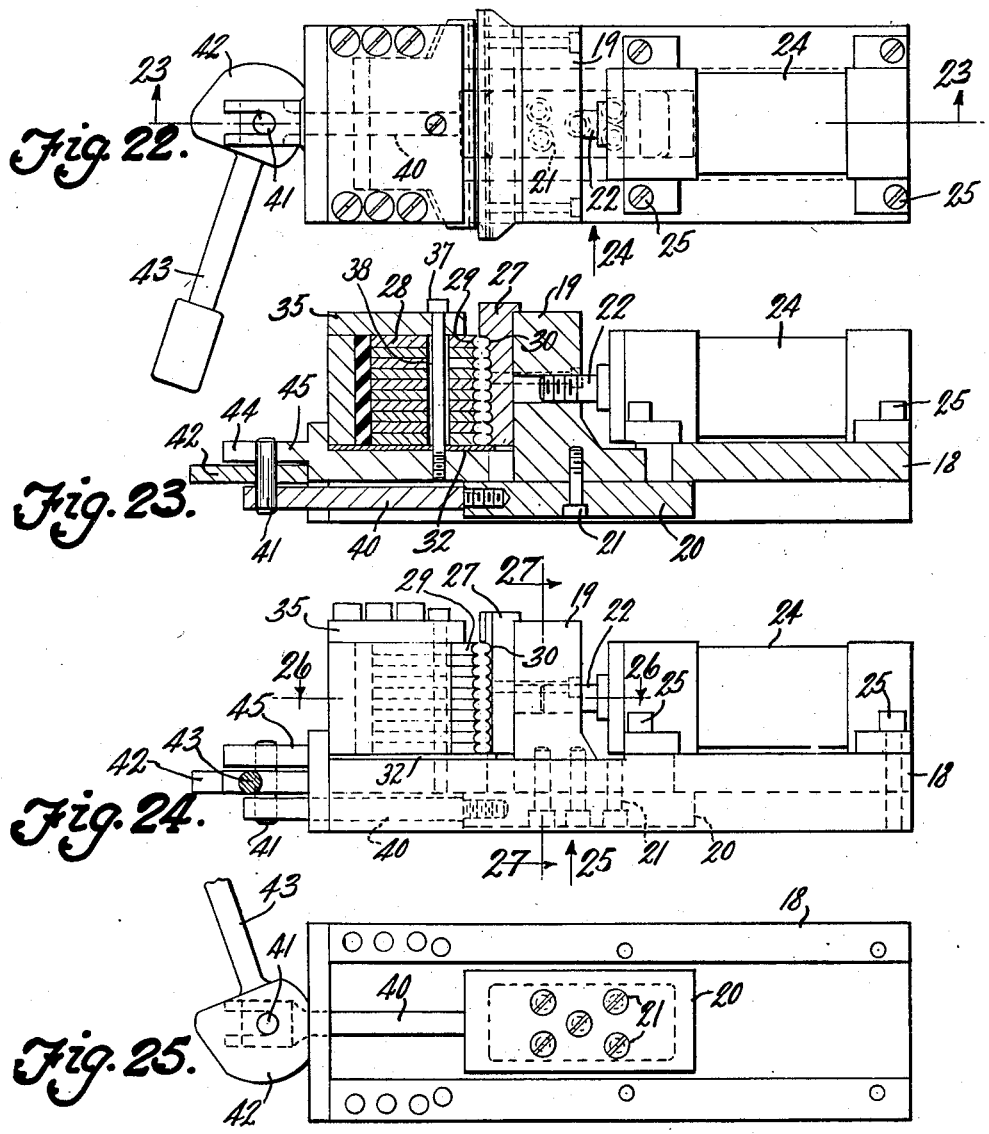
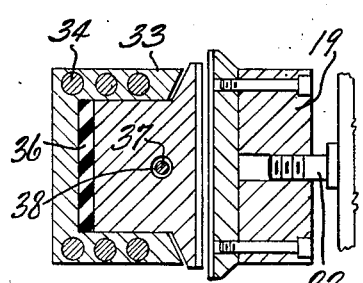
INVENTORS
BERNARD E. FRANK
& JOHN W. ARMSTRONG
BY Spencer Hardman & Fehr
their ATTORNEYS

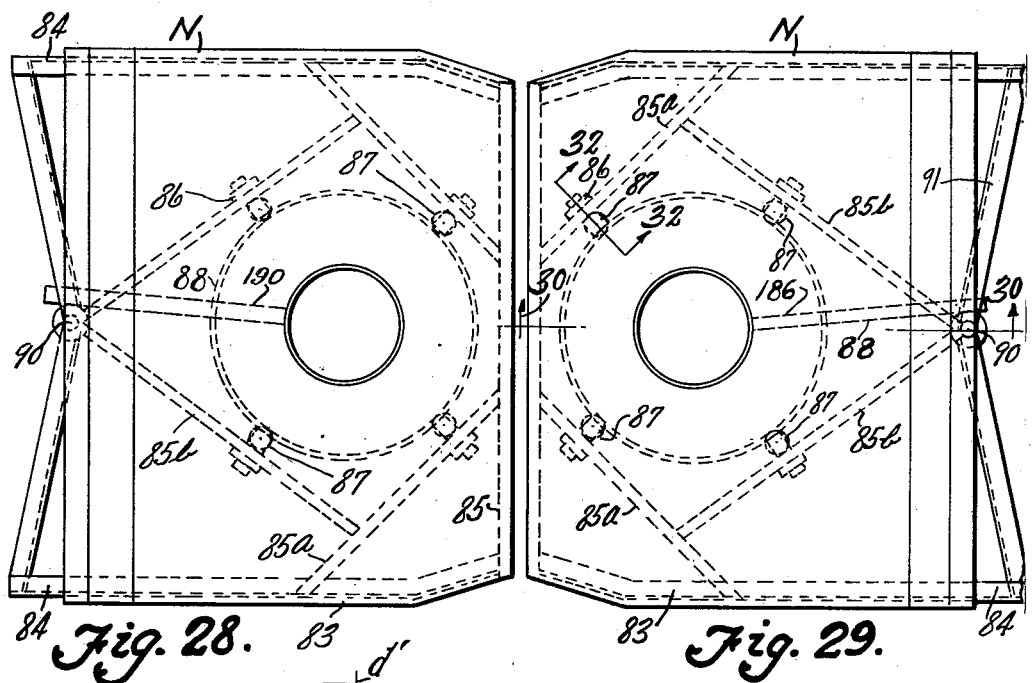

Aug. 28, 1951 J. W. ARMSTRONG ET AL 2,565,940
TUBE-BENDING APPARATUS
Filed Aug. 27, 1949 15 Sheets-Sheet 7
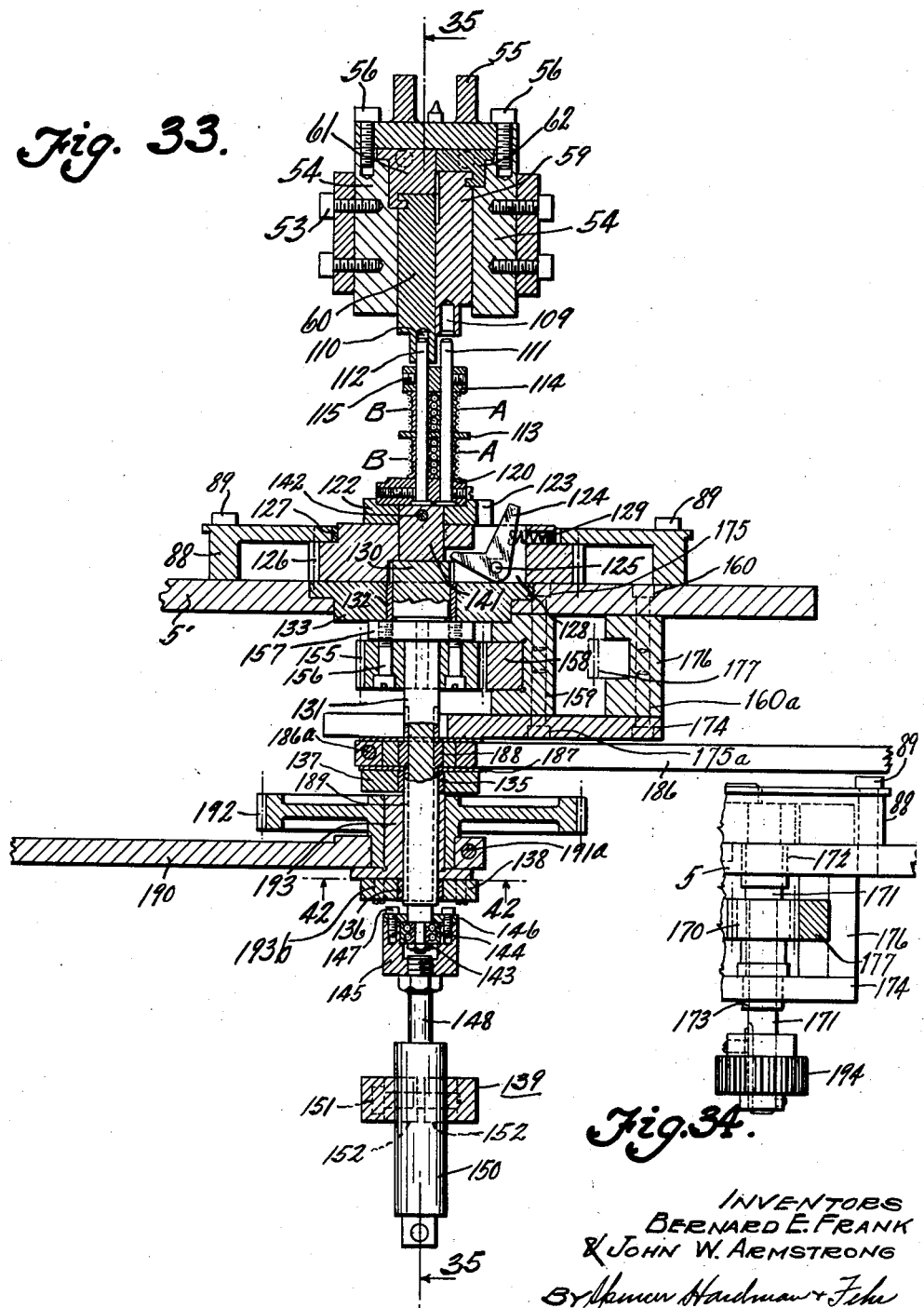

Aug. 28, 1951 J. W. ARMSTRONG ET AL 2,565,940
TUBE-BENDING APPARATUS
Filed Aug. 27, 1949 15 Sheets-Sheet 8

INVENTORS
BERNARD E. FRANK
& JOHN W. ARMSTRONG
their ATTORNEYS

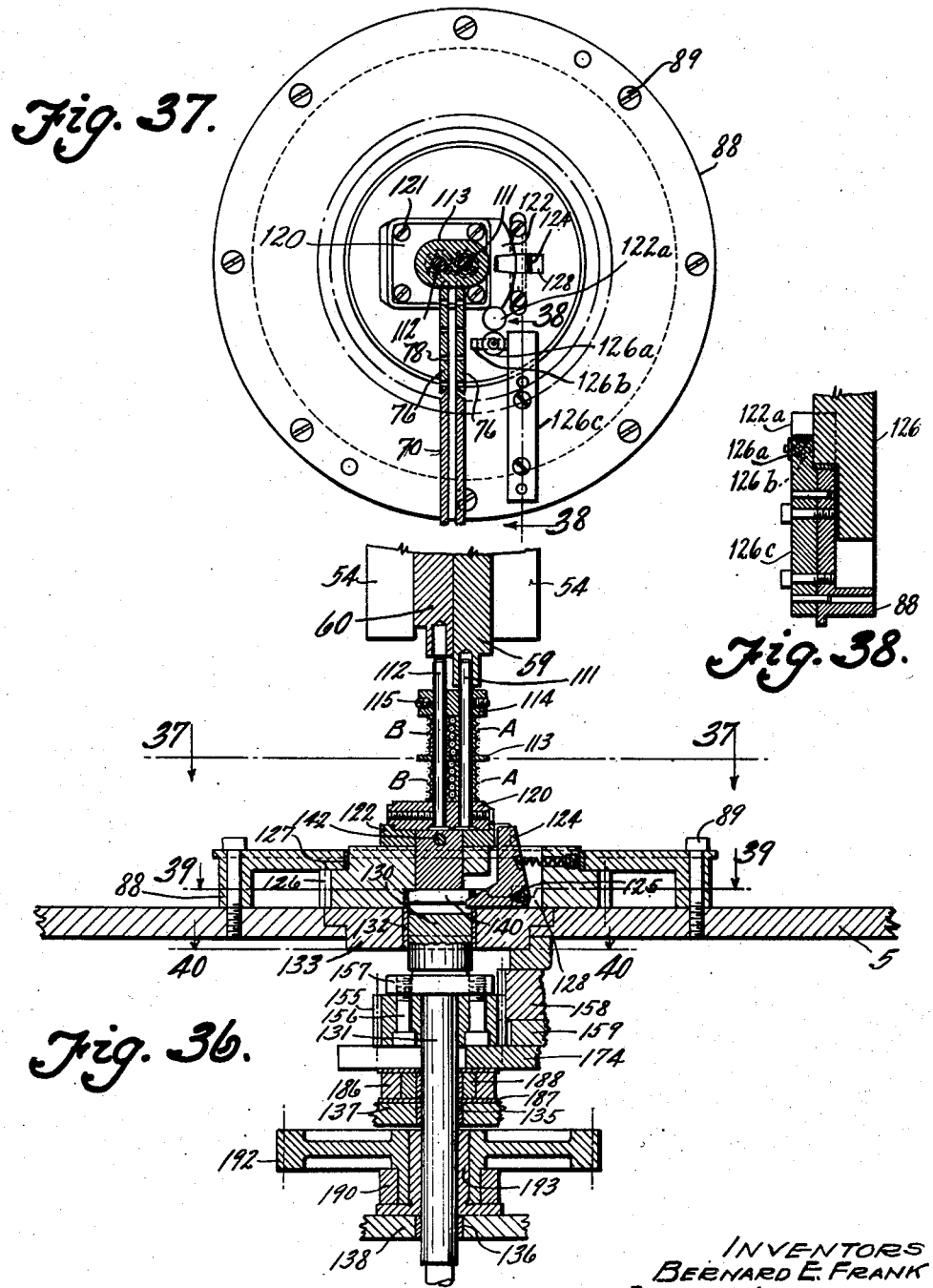

Aug. 28, 1951         J. W. ARMSTRONG ET AL         2,565,940
                       TUBE-BENDING APPARATUS
Filed Aug. 27, 1949                          15 Sheets-Sheet 10

INVENTORS
BERNARD E. FRANK
& JOHN W. ARMSTRONG
by Spencer Hardman & Fehr
their ATTORNEYS

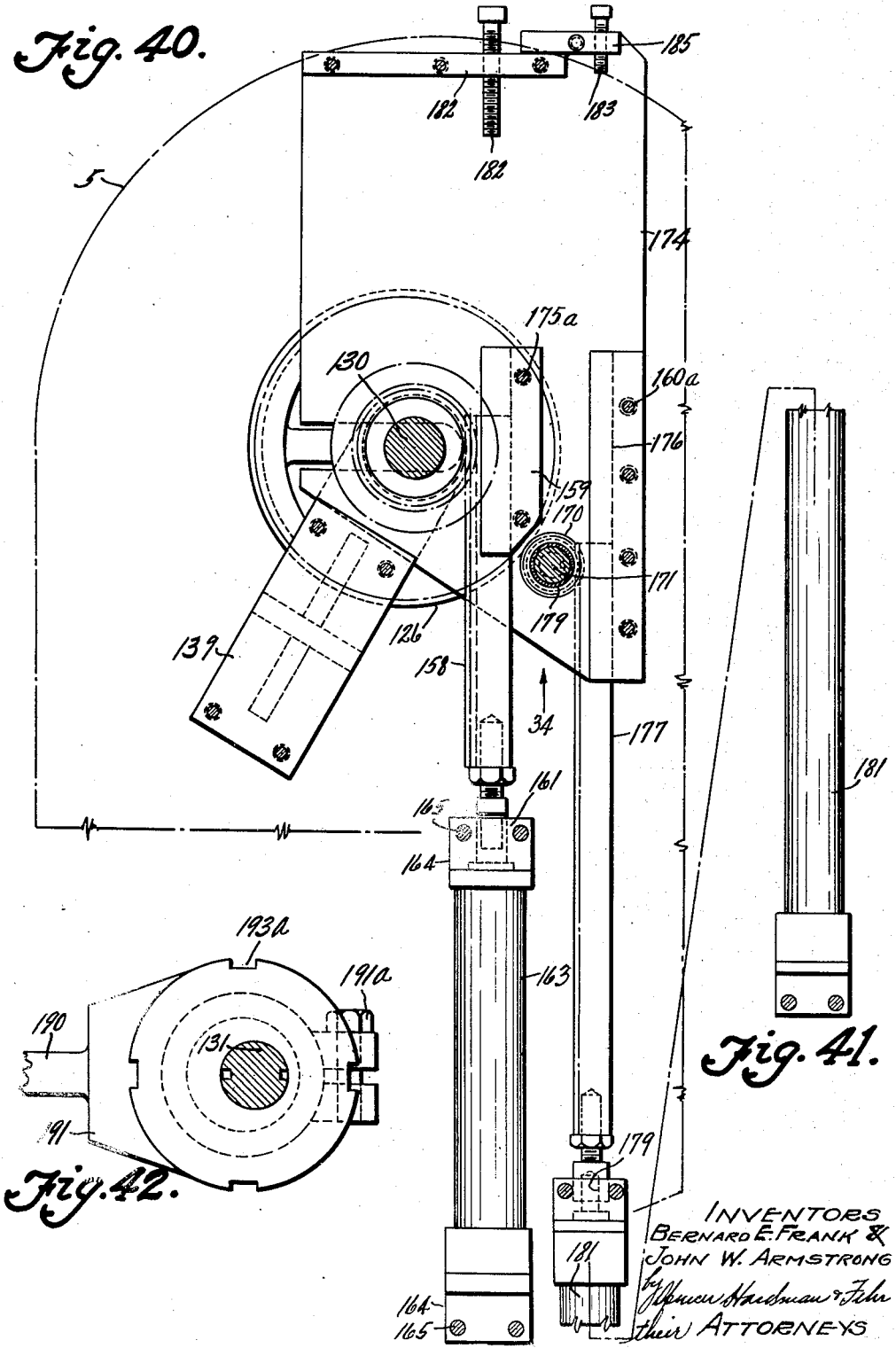

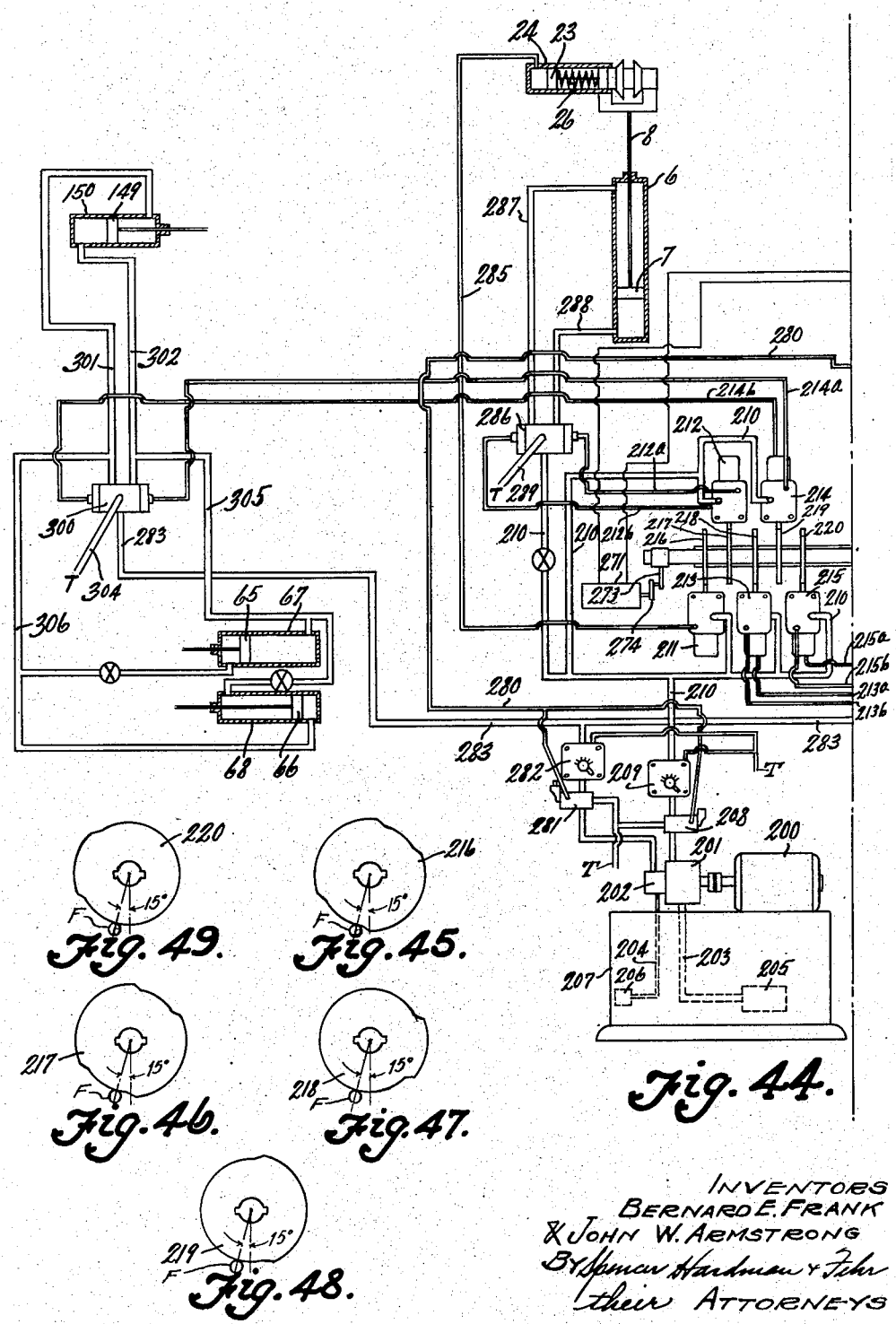

Aug. 28, 1951  J. W. ARMSTRONG ET AL  2,565,940
TUBE-BENDING APPARATUS
Filed Aug. 27, 1949  15 Sheets—Sheet 14
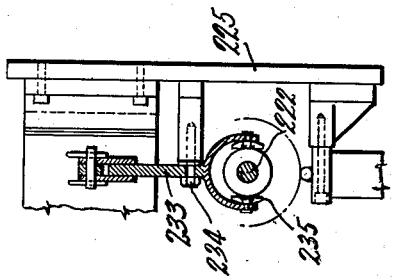
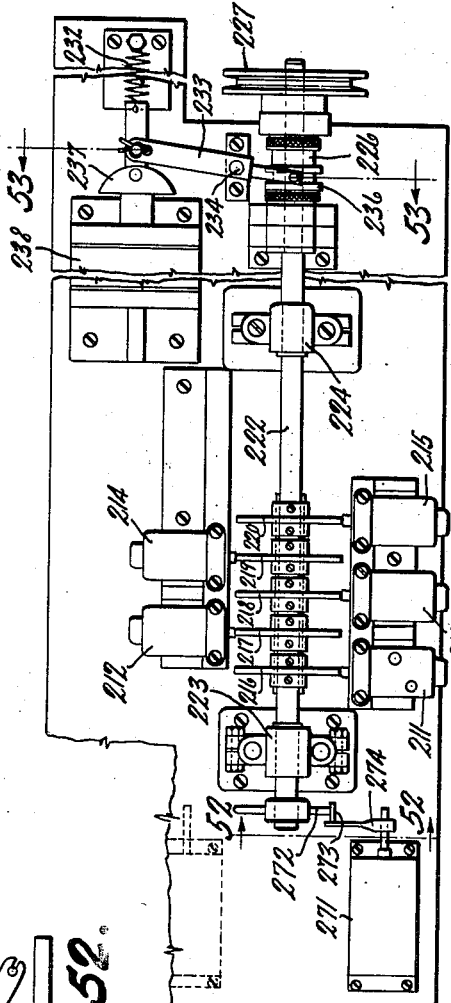
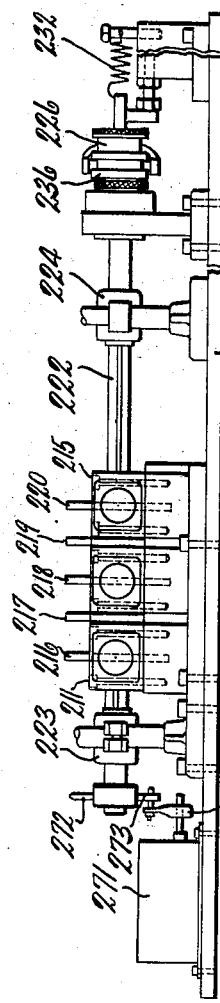
INVENTORS
BERNARD E. FRANK
& JOHN W. ARMSTRONG
BY Spencer Hardman & Fehr
their ATTORNEYS

Patented Aug. 28, 1951

2,565,940

UNITED STATES PATENT OFFICE 2,565,940

TUBE-BENDING APPARATUS

John W. Armstrong and Bernard E. Frank, Rochester, N. Y., assignors to General Motors Corporation, Detroit, Mich., a corporation of Delaware Application August 27, 1949, Serial No. 112,792

9 Claims. (Cl. 153—45)

1

This invention relates to the manufacture of tubing serpentines comprising straight portions and 180° bent portions.

An object of the invention is to provide a machine for bending a plurality of pieces of tubing simultaneously into serpentine shape. In the disclosed embodiment of the invention, this object is accomplished by a combination of elements comprising a pair of grooved rolls, parallel rods on which the rolls are respectively journaled, a support to which the rods are attached and which so spaces the rods that the grooves of the rolls combine to form openings into which the pieces of tubing closely fit, rotators respectively in axial alignment with the rods, devices respectively for effecting the turning of the rotators in opposite directions for normal position and return to normal position, means for effecting the coupling of one rotator with the rod support and the uncoupling of the other rotator from the rod support whereby, during the turning of the coupled rotator, the rod not aligned with that rotator will move orbitally about the axis of the rod aligned with that rotator, and vice versa, means for retaining in fixed position the portion of tubing leading to the rolls during the bending operations, and means for longitudinally feeding a certain amount of tubing between the rolls prior to bending operations.

Further objects and advantages of the present invention will be apparent from the following description, reference being had to the accompanying drawings, wherein a preferred embodiment of the present invention is clearly shown.

In the drawings:

Figs. 1 to 8 are diagrams showing the various steps in the operation of the bending machine.

Fig. 9, Sheet 2, and Fig. 13, Sheet 3, together form a top view of the machine.

Fig. 10, Sheet 2, and Fig. 14, Sheet 4, together form a side view of the machine.

Fig. 11, Sheet 2, is a view on the line 11—11 of Fig. 9.

Fig. 11A is a sectional view on line 11A—11A of Fig. 11.

Fig. 12 is a sectional view on the line 12—12 of Fig. 10.

Fig. 12A is a sectional view on line 12A—12A of Fig. 10.

Figures 13, 14:
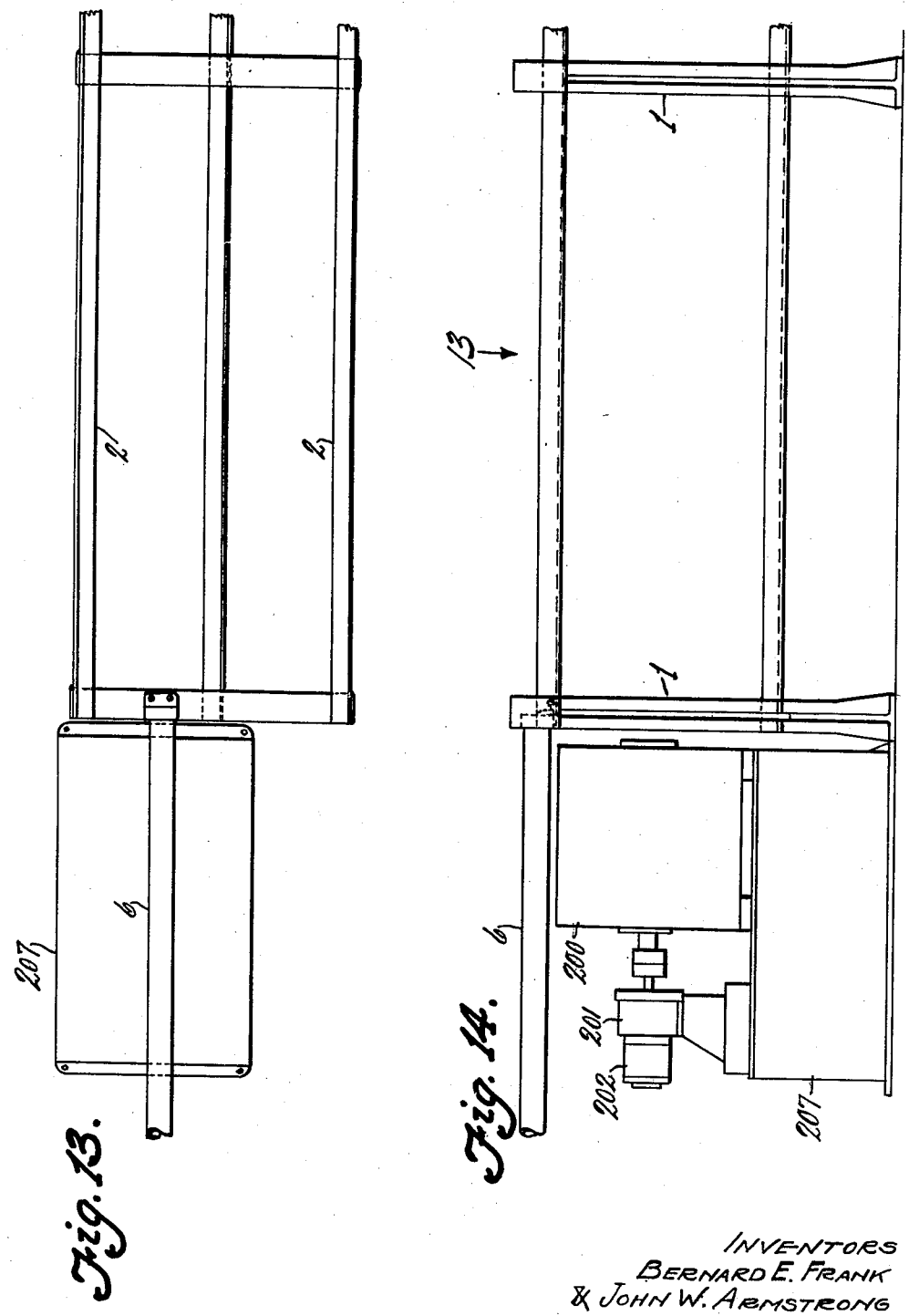

Fig. 15, Sheet 4, is a plan view of a machine showing the left end of Fig. 9 and is drawn to a larger scale than Fig. 9, the part in section being on line 15—15 of Fig. 16.

Fig. 16 is a view in the direction of arrow 16 of Fig. 15.

Fig. 17 is a view in the direction of arrow 17

2 of Fig. 15, the portions of Fig. 17 which is in section being taken on the line 17—17 of Fig. 15.

Fig. 18 is a sectional view on line 18—18 of Fig. 16.

Fig. 19 is a fragmentary view in the direction of arrow 19 of Fig. 16.

Fig. 20 is a sectional view on the line 20—20 of Fig. 16.

Fig. 21 is a sectional view on the line 21—21 of Fig. 20.

Fig. 22 is a plan view of a tubing clamp M, shown in Fig. 10.

Fig. 23 is a sectional view on line 23—23 of Fig. 22.

Fig. 24 is a side view in the direction of arrow 24 of Fig. 22.

Fig. 25 is a bottom view in the direction of arrow 25 of Fig. 24.

Figs. 26 and 27 are sectional views on the lines 26—26 and 27—27, respectively, of Fig. 24.

Fig. 28 is a plan view of a turn-table N of Fig. 10, said view being taken in the direction of arrow 28 of Fig. 10.

Fig. 29 is a view similar to Fig. 28, showing the table N in a different position.

Fig. 30 is a sectional view on the line 30—30 of Fig. 29.

Fig. 31 is a view on the line 31—31 of Fig. 10, showing a motion check mechanically associated with the turntable.

Fig. 32 is a sectional view on the line 32—32 of Fig. 29.

Fig. 33 is a sectional view on the line 33—33 of Fig. 16, showing the bending rolls and operating mechanism.

Fig. 34 is a fragmentary view in the direction of arrow 34 of Fig. 40.

Figure 35:
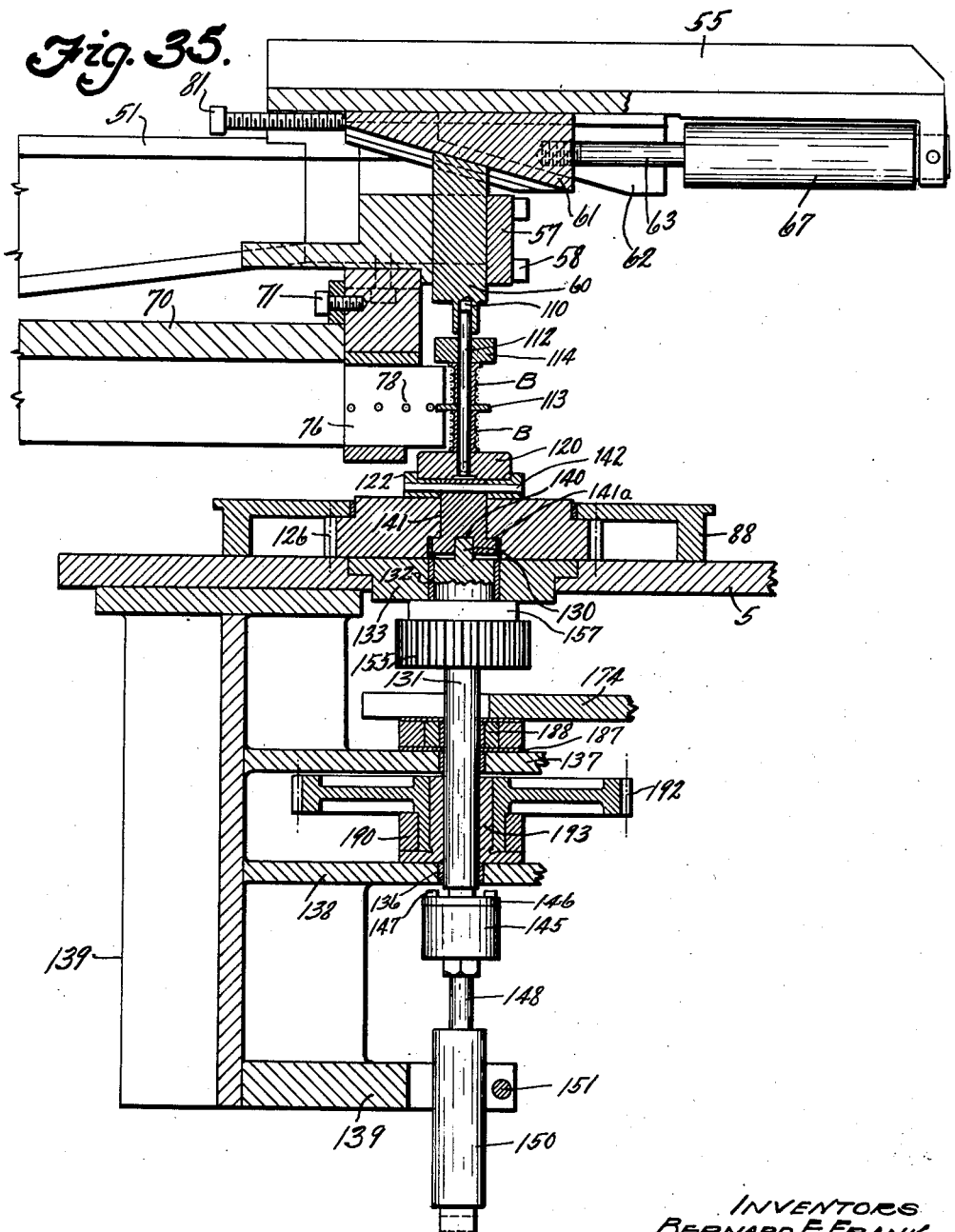

Fig. 35 is a sectional view on the line 35—35 of Fig. 33.

Fig. 36 is a sectional view similar to Fig. 33, showing certain parts in other positions.

Fig. 37 is a sectional view on the line 37—37 of Fig. 36.

Fig. 38 is a sectional view on the line 38—38 of Fig. 37.

Figure 39:
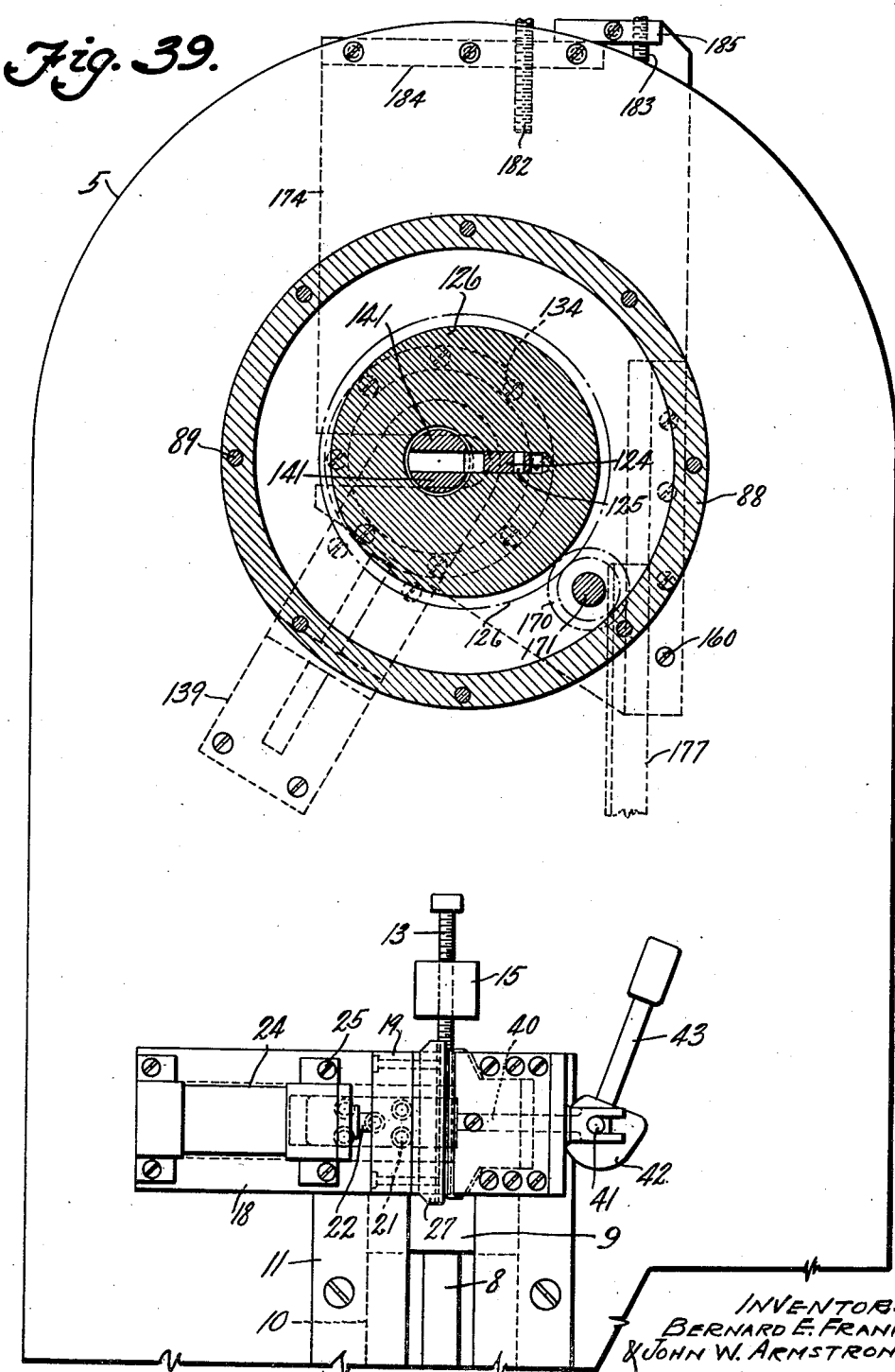

Fig. 39 is a sectional view on line 39—39 of Fig. 36.

Figs. 40 and 41 together form a sectional view on the line 40—40 of Fig. 36.

Fig. 42 is a sectional view on the line 42—42 of Fig. 33.

Figure 43:
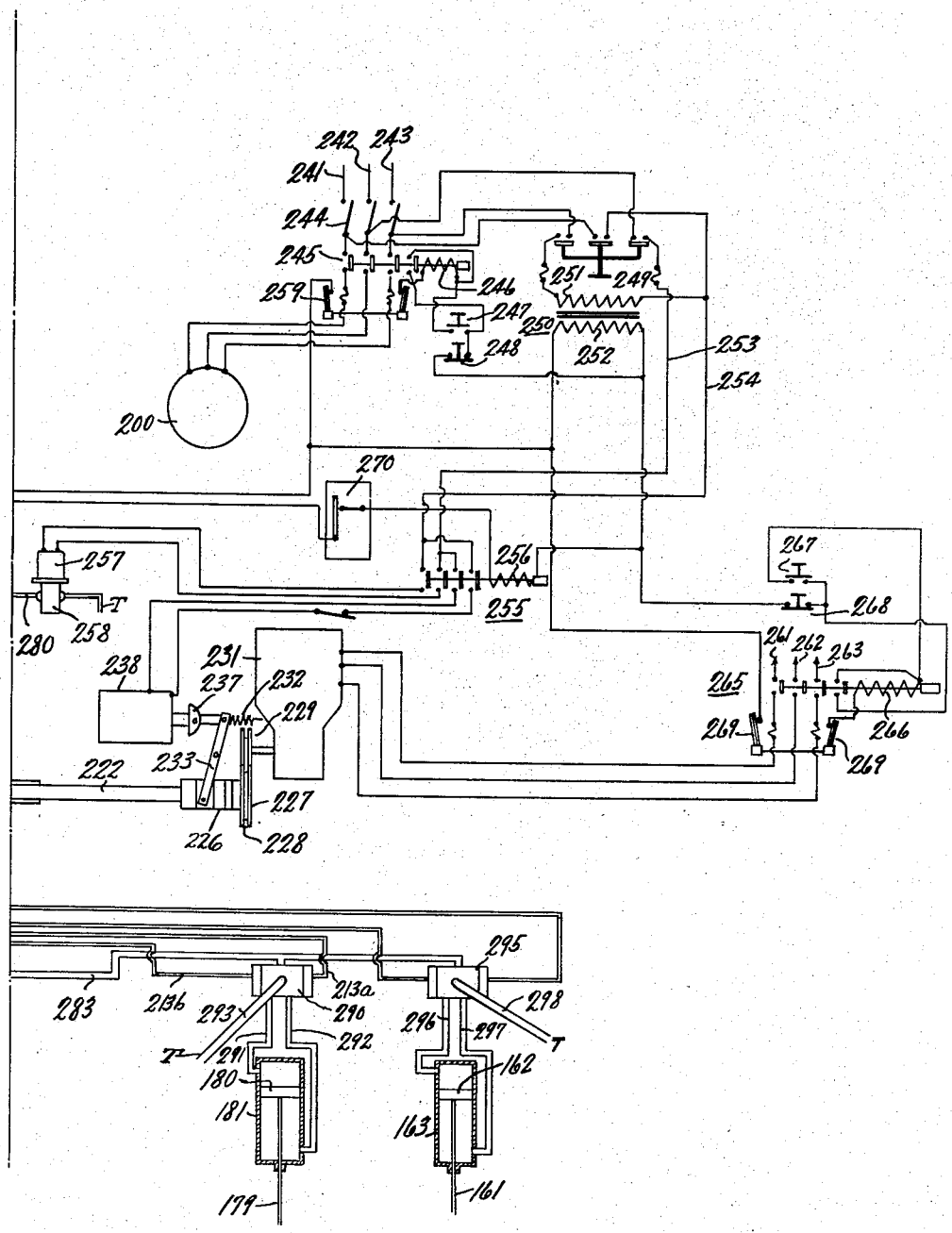

Figs. 43 and 44 together form an hydraulic and an electrical diagram of the machine.

Figs. 45 to 49 are side views of the various cams included in the diagram shown in Fig. 44.

Fig. 50 is a plan view of the valve controlling apparatus shown in Fig. 44, and is drawn to a larger scale than Fig. 44.

Fig. 51 is a view in the direction of arrow 51 of Fig. 50.

Figs. 52 and 53 are sectional views taken, respectively, on the lines 52—52 and 53—53 of Fig. 50.

Figure 54:
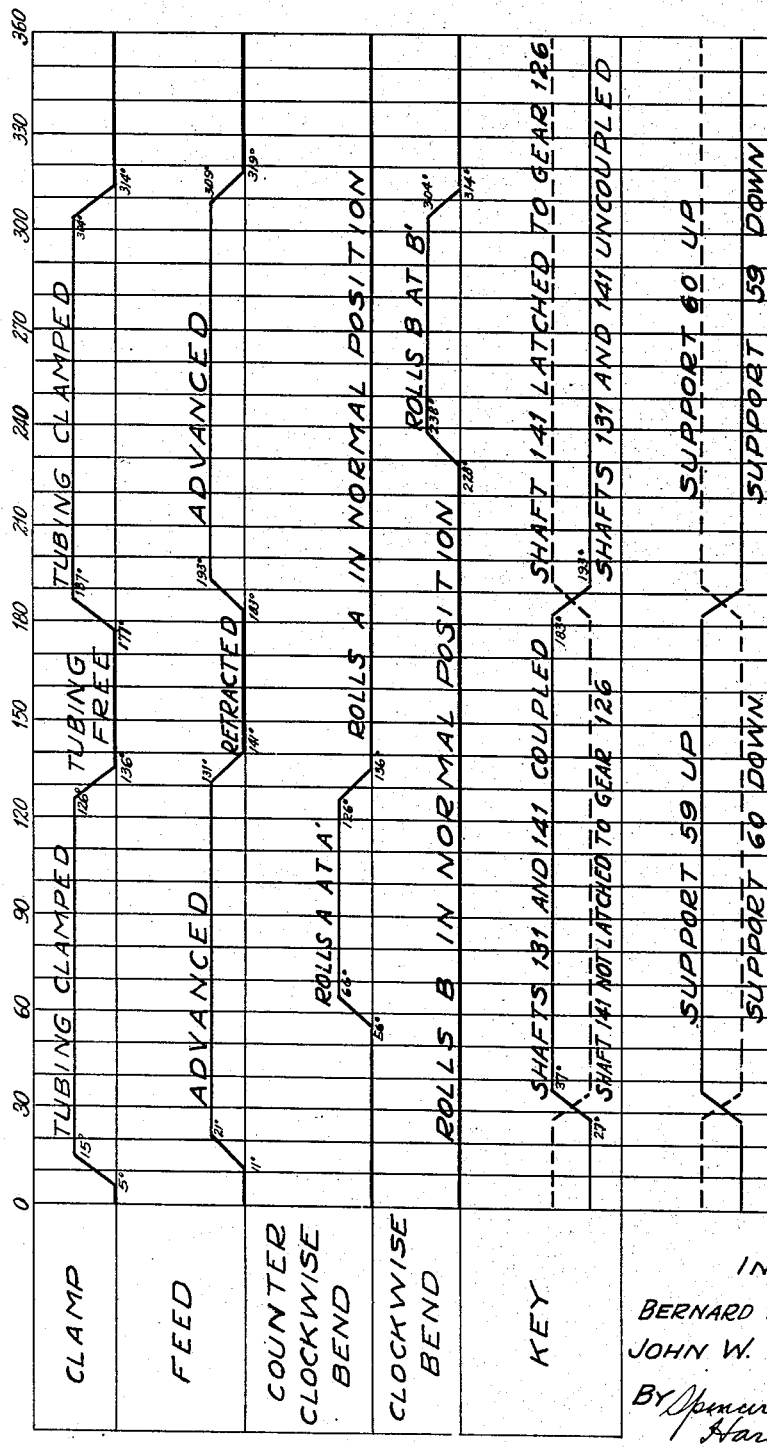

Fig. 54 is a timing chart.

Referring to Fig. 1, the tubing T is passed through a guide C and between grooved bending rolls A and B. While roll B remains fixed, roll A moves orbitally from its initial position as represented by the dot-dash circle A in Fig. 2, to position A', to cause the tubing to be bent 180° around roll B. Roll A then returns to its initial position, as shown in Fig. 3. The tubing T is fed again, as shown in Fig. 4, and roll B is caused to move from its initial position represented by dot-dash circle B in Fig. 5, orbitally around roll A to position B'. Roll B then returns to its initial position, as shown in Fig. 6. This cycle of operations is repeated, the tubing being fed again as shown in Fig. 7 and roll A is caused to move orbitally around roll B to position A' as shown in Fig. 8. These cycles continue as long as necessary to form the length of tubing in the required number of straight portions joined by 180° arcuate portions.

Figs. 13 and 14 show the left portion of a rack for supporting a supply of lengths of tubing. This rack comprises a plurality of upright frames 1, attached to horizontal angles 2. The rack, as shown in Figs. 13 and 14, extends to the right a distance sufficient to support the tubing.

Referring to Figs. 9 and 10, legs 3 support side bars 4 which support a main table plate 5 and a shorter plate 5a. Plate 5a and the left-hand frame 1 (Figs. 13 and 14) support a feed cylinder 6 receiving a piston 7 (Fig. 44), connected by rod 8 with a plate 9, guided by rails 11 (Fig. 12), attached to plate 5 and spaced by bars 10. The slide 9 is moved between stops provided by screws 12 and 13 (Fig. 10) threaded, respectively, through brackets 14 and 15, the latter being attached to the plate 5 and the former being attached to the plates 11 (Fig. 12) and provided with a vertical portion 16 having a notch 17 for receiving a plurality of tubing lengths stacked vertically. The slide 9 supports a plate 18 (Figs. 10, 22–25, 27) which guide a block 19 (forming part of the tube-clamping device M shown in Fig. 10) for movement at right angles to rails 11 and the direction of movement of slide 9. Block 19 is retained upon plate 18 by plate 20 secured by screws 21. Block 19 is connected with a rod 22 connected with a piston 23 (Fig. 44, top) received by a cylinder 24 which screws 25 attach to plate 18. A spring 26 (Fig. 44) in cylinder 24 urges the piston 23 left in Fig. 44, or right in Fig. 22, normally to separate the tubing clamping jaws. Jaw 27 is attached to block 19. The other jaw comprises a plurality of plates 28, each having a concave surface 29 in alignment with a concave surface 30 of jaw 27. Thus, the jaws are adapted to clamp the plurality of lengths of tubing stacked vertically. Jaw 27 is located above a plate 32 upon which the jaws 28 are placed. The jaws 28 are movable horizontally and are guided for such movement by U-shaped member 33 (Fig. 26) which, together with the plate 32 and a cover 35, are attached to plate 18 by screws 34. A rubber block 36, located between the jaw plates 28 and the member 33 provides a resilient backing whereby the tubes are yieldingly clamped and each tube is gripped by the same amount of pressure. A screw 37 passes through the cover 35 and larger holes 38 in jaw plates 28 and is screwed into the plate 18. The clearance between screw 37 and holes 38 permits the jaw plates 28 to adapt themselves to the tubing lengths which they engage.

Block 20 is attached by a bar 40 and a pin 41 to a cam 42 having a handle 43. Pin 41 is received by a notch 44 in a lug 45 of plate 18. When cam 42 is in the position shown in Fig. 22, the retraction of jaw 27 is limited by virtue of engagement of cam 42 with plate 18. If handle 43 is moved clockwise (Fig. 22), the jaw 27 is manually advanced to clamping position.

Referring to Figs. 9 and 10, the plate 5 supports bracket 50 having overhanging portions 51 supporting bar 52 and connected by screws 53 (Fig. 17) to a frame 54 attached to a bar 55 by screws 56 and attached at its left side (Fig. 16) to a plate 57 by screws 58. The frame 54 guides vertically movable bars 59 and 60 which are caused to move by cams 61 and 62, respectively, connected by rods 63 and 64 with pistons 65 and 66, respectively (Fig. 44), and cylinders 67 and 68, respectively, which are supported by the bar 55. Each of the cams 61 and 62 has a diagonal or slanting rib 69 for engaging a slanting groove in the bar so that horizontal movements of the cams cause vertical movements of the bars. These bars 59 and 60 are caused to move alternately in opposite directions so that when one is down, the other will be up.

The brackets 50 support a tube guide 70, one end of which is attached to the cross bar 52 and the other end is connected by a screw 71 with a block 72 attached to a plate 73 which screws 74 attach to the frame 54 which supports a bracket 55 attached to frame 54 by screws 56 (Figs. 16 and 17). A member 75 of channel shaped formation is attached to block 72 and has its side flanges 76 joined at their bottoms by a plate 77 and these flanges are provided with a horizontal row of holes 78. These holes are provided to permit insertion of small pins therein. These pins are in alignment with the plate 113 and serve to separate the upper five tubes from the lower group of five tubes. The flanges are beveled at 79 (Fig. 21) to facilitate the entrance of the tubing between the flanges and are beveled at 80 so that the member 72 can terminate close to the grooved bending rolls A and B. Movement of the cams 61 and 62 (Fig. 15) to the right is limited by stop screws 81 threaded through a plate 82 integral with bar 55.

During the bending operations performed by rolls A and B, as shown in Figs. 1 to 8, it is desirable to support the tubing as it is bent. For this purpose, a rotary table N (Figs. 9, 10, 28 and 29) is provided. Table N comprises a plate 83 attached to a framework comprising parallel angles 84, a bar 85, and diagonal bars 85a and 85b. Bars 85a and 85b are supported by rollers 86 (Fig. 32) which roll on the plate 5. Bars 85a and 85b support (Fig. 29), in the same horizontal plane, rollers 87 which engage a drum 88 or circular plate which screws 89 attach to the plate 5 (Fig. 33). The table N is caused to rotate about the axis of the drum 88 by a mechanism to be described and having levers which engage a rod 90 extending downwardly from the table plate 83 and attached by angles 91 to side angles 84 and attached to diagonal bars 85b and to an angle 92 (Fig. 30). The movement of the table is under control by hydraulic check 95 (Fig. 31) which is similar to a door check.

Check 95 is attached to a pad 96 supported by one of the cross channels 3a connecting legs 3 (Fig. 10). Check 95 has an arm 97 connected by link 98 with a lever 99 pivotally supported by a bearing stud 100 supported by a member 101 which is part of a framework 102 extending from and attached to the frame which supports the plate 5, as shown in Fig. 10. Lever 99 has a hole 103 for receiving the rod 90 and lever 99 is received between collars 104 (Fig. 30) pinned to the rod 90. In one position of table N, as shown in Fig. 28, the axis of rod 90 will be at $d$ (Fig. 31). The connection of the other end of lever 99 with link 98 is represented by $a$, and the connection of check arm 97 with link 98 is represented by $b$. During the 180° rotation of table N in a clockwise direction, as viewed in Fig. 28, the axis of rod 90 moves from $d$ to $d''$ and passes through a position $d'$, and the shorter end of lever 99 moves from $a$ to $a''$ and passes through a position $a'$. During movement from $d$ to $d'$, $a$ moves to $a'$ and $b$ moves to $b'$ The check 95 does not retard movement from $b$ to $b'$; but, during movement from $d'$ to $d''$, this movement is retarded by the check 95 as the end of lever 97 moves from $b'$ to $b$, which position is occupied when rod 90 is at $d''$ and the shorter lever end is at $a''$. Consequently about the first half of the clockwise rotation of table N is free and the remaining portion is retarded as the table moves from the position shown in Fig. 28 to that shown in Fig. 29. Similarly, as the table is moved from the position shown in Fig. 29 to that shown in Fig. 28, about the first half of said movement is free and the remaining portion is resisted by the check. Consequently the shock of stopping the table is minimized.

Referring to Fig. 33, the bars 59 and 60 have sockets 109 and 110 in alignment with rods 111 and 112 which pass, respectively through two grooved rolls A and two grooved rolls B. The upper set of rolls A and B is separated from the lower set by a plate 113 through which the rods pass. These rods pass also through a plate 114 secured to the rods by set screws 115 and are secured to a plate 120 which screws 121 (Fig. 37) secure to a latch plate 122 having a notch 123 for receiving a latch lever 124 pivotally supported by a pin 125 attached to a gear 126 supported by plate 5 and rotatable in a bearing 127 provided by drum 88. The gear 126 rotates on an axis in alignment with the axis of rod 111 carrying rollers A. The lever 124 is received by a pocket 128 in gear 126 and a spring 129 urges the lever 124 toward the notch 123 of the latch plate 122. As shown in Fig. 33, lever 124 has been retracted from the notch 123 due to the engagement of said lever with a tongue 130 provided on the upper end of a shaft or rotator 131 which is slidable vertically in a bearing 132 provided by a plate 133 which screws 134 (Fig. 39) attach to plate 5 and in bearings 135 and 136 (Fig. 33), provided, respectively, by arms 137 and 138 of a bracket 139 (Fig. 35) supported by plate 5. The tongue 130 is received by groove 140 (Fig. 35) in a shaft or rotator 141 having a retaining shoulder 141a and aligned with the axis of rod 112 which carries the roll B and connected by a pin 142 with plate 122 to which plate 120 is attached.

The threaded lower end of shaft 131 (Fig. 33) is secured by a nut 143 to the inner race of a ball thrust bearing 144 whose outer race is received by a cup 145 and is retained by a plate 146 attached to the cup by screws 147. Cup 145 is connected by a rod 148 with a piston 149 (Fig. 44) in a cylinder 150 clamped by a screw 151 between clamping portions 152 of the bracket 139. When the piston 149 moves up the shaft 131 is connected with the shaft 141 by the engagement of tongue 130 with the notch 140 in shaft 141 and the lever 124 is retracted from the notch 123 of plate 122 so that the plate 122 may be rotated by shaft 131, thereby causing the rollers A to move orbitally around the rollers B, as shown in Fig. 2, and then back again to the normal position, as shown in Fig. 3. These movements are effected by a mechanism which comprises a gear 155, which screws 156 attach to flange 157 of shaft 131. Gear 155 meshes with a rack 158 guided horizontally by a block 159 attached to plate 5 by screws 175 (Figs. 33, 40). Rack 158 is connected with a rod 161, connected with a piston 162 (Fig. 43) in a cylinder 163 attached by brackets 164 and screws 165 to plate 5. Admission of pressure fluid to that end of cylinder 163 which appears as lower in Fig. 40 causes the rollers A to move counterclockwise to the position A' in Fig. 2, and admission of pressure fluid at the upper end of cylinder 163 causes return of rollers A to normal position.

In preparation for movement of rollers B orbitally from normal position, shown in Fig. 4, to the position of B' shown in Fig. 5, pressure fluid is admitted to the upper end of cylinder 150 (Fig. 33) to cause disengagement of shaft 131 from shaft 141 and the latching of plate 122 to the gear or rotator 126 by engagement of lever 134 with the notch 123 of plate 122 due to the action of spring 129. After this has been done, the gear 126 can be rotated on an axis which is in alignment with the axis of rod 111 which carries rolls A. The mechanism for rotating the gear 126 comprises a gear 170 (Figs. 39 and 34) attached to a shaft 171 journaled in a bearing 172 provided by plate 5 and in a bearing 173 provided by a plate 174 which is attached to guide 159 by screws 175a (Fig. 33) and which is attached by screws 160a to a guide 176 attached to plate 5 by screws 160 (Figs. 33 and 40). Guide 176 supports a rack 177 meshing with a gear 170 attached to shaft 171. Rack 177 (Fig. 40) is connected by a rod 179 with a piston 180 (Fig. 43) in a cylinder 181 attached to plate 5. Admission of pressure fluid to that end of cylinder 181 which appears as lower in Fig. 40, causes counterclockwise movement of shaft 171 as viewed from above to effect clockwise movement of rollers B orbitally around rollers A from the position shown in Fig. 4 to that shown in Fig. 5 at B'; and admission of pressure fluid to the other end of cylinder 181 causes roller B to return to normal position. Screws 182 and 183 (Fig. 39) threaded, respectively, through bars 184 and 185, which space plate 174 from plate 5, are engageable, respectively, by racks 158 and 177, thereby limiting the forward movement of the racks, said movement appearing as "up" in Fig. 40. Screws 182 and 183 therefore determine the extent of orbital movement of the rollers for the bending operation. On the return movement of gear 126 after the right-hand bend, gear 126 is stopped in a definite position by engagement of a stop screw 126b threaded through a post 126a attached to gear 126 with a bar 126c attached to plate 88. On the return movement of shaft 141 after the left-hand bend, shaft 141 is stopped in a definite position by virtue of the engagement with stop 122a attached to gear 126 of the plate 122 connected with shaft 141.

During movement of rollers A orbitally counterclockwise around the axis of rollers B, the table N (Figs. 28 and 29) is caused to move counterclockwise from the position shown in Fig. 29 to that shown in Fig. 28 by virtue of engagement of an arm 186 clamped by a screw 186a (Fig. 33) to a disc 187 connected with shaft 131 by keys 188 received by grooves 189 in said shaft. Therefore, during the bending of the tubing around rollers B by counterclockwise orbital movement of rollers A, the table N is caused to move counterclockwise with the tubing as it is bent. During return of rollers A to the normal position, the table N is not rotated but remains in the position shown in Fig. 28. During the bending of the tubing by orbital clockwise rotation of rollers B around the axes of rollers A to position B' shown in Fig. 5, the table N is caused to move clockwise by virtue of engagement with rod 90 by a lever 190 (Fig. 33) whose hub 191 is clamped by a screw 191a (Fig. 42) to the hub of a gear 192 on a bushing 193 through which the shaft 131 passes eccentrically of the bushing. Gear 192 meshes with a gear 194 (Fig. 34) connected with shaft 171. When rack 177 moves up in Fig. 40 to cause clockwise movement of gear 126 as viewed from above, arm 190 moves clockwise to cause, by virtue of engagement with rod 90, rotation of table N from the position shown in Fig. 28 to that shown in Fig. 29. When rack 177 moves down in Fig. 40 to effect counterclockwise movement of rollers B to normal position shown in Fig. 6, arm 190 returns by counterclockwise movement to its normal position but table N remains in the position shown in Fig. 29 ready to carry the work as it is moved from the position shown in Fig. 7 to that shown in Fig. 8.

In Figs. 28 and 29 the approximate position of the actuating arms 186 and 190 with respect to the rod 90 which is moved thereby to oscillate the table N, is shown in dotted lines. The rod 186, when inoperative, occupies a position to engage the rod 90 on the upper side of such rod as viewed in Fig. 29. The inoperative position of arm 190 is similarly indicated in Fig. 28. When the arm 186 is rotated in a clockwise direction by its operating means, it engages the rod 90 and moves the table N to the Fig. 29 position, and when the arm 190 is rotated by its operating means in a counterclockwise direction, it engages the rod 90 to move the table N back to the Fig. 28 position. These operating movements of the arms 186 and 190 are repeated to effect repeated oscillations of the table N and the arms 186 and 190 are restored to their inoperative positions between their effective movements when they rotate the table N.

To facilitate proper meshing relation of gears 192 and 194, the bushing 193 may be rotated about the shaft 131 by applying a spanner wrench to its notches 193a. The bushing 193 is retained in adjusted position by tightening screws 193b (Fig. 33) which clamp it against the bracket arm 138.

Referring to Fig. 44, a motor 200 drives a low pressure, high volume pump 201 and a high pressure, low volume pump 202 connected, respectively, with inlet pipes 203 and 204 into which oil flows through filters 205 and 206, respectively, from a tank 207. The outlet of pump 201 is connected through a by-pass controlling valve 208 and a flow control valve 209 with a pipe 210 which is connected with mechanically controlled valves 211, 212, 213, 214 and 215 whose actuators are controlled respectively by cams 216, 217, 218, 219 and 220, the contours of which are shown, respectively, in Figs. 45, 46, 47, 48 and 49. These cams are rotated by a shaft 222 (Fig. 50) rotatably supported by bearing brackets 223 and 224 mounted on a plate 225 to which the valves 211—215 are fixed. Shaft 222 is connectible by a clutch 226 with a pulley 227 connected by a belt 228 with a pulley 229 connected with the output shaft of a gear reducer, whose input shaft is driven by an electric motor 231 (Fig. 43). Normally, the clutch 226 is disengaged through the action of a spring 232 connected with a lever 233 (Fig. 50) which is pivoted at 234 and urged clockwise by the spring 232, said lever carrying shoes 235 received by a groove in a collar 236 which, when in the position shown in Fig. 50, causes the clutch 226 to be disengaged. Lever 233 is also connected with the armature 237 of a solenoid 238, which, when energized, causes the collar 236 to move right to effect engagement of the clutch.

Wires 241, 242, 243 (Fig. 43) connected with a source of alternating current can be connected with pump motor 200 by a three-pole switch 244 and a relay switch 245 having a magnet coil 246 under control by a start switch 247 and a stop switch 248. Switch 244 and switch 249, when closed, effect connection of a primary winding 251 of a transformer 250 with wires 241 and 243 and the connection of wires 253 and 254 with wires 242 and 241. Wires 253 and 254 are connected with contacts of a relay switch 255 having a magnet coil 256. The energization of coil 256 causes wires 253 and 254 to be connected with solenoid 238 and with a solenoid 257 controlling a valve 258 for a purpose to be described. The coil 246 of relay switch 245 is connected with the secondary 252 of transformer 250 through a circuit which requires the closing of switch 247 for initial energization of coil 246 after which its circuit is maintained by a closed contact of this relay switch. The open-circuiting of coil 246 is effected by opening the normally closed stop switch 248 or by the opening of normally closed overload switches, each having a bimetallic blade 259. Motor 200 is started by closing switch 247 and is stopped by opening switch 248 or by the opening of any of the overload circuit breakers.

Electric motor 231 is connected with current source wires 261, 262 and 263 by a relay switch 265 having a magnet coil 266 and controlled in the same manner as the relay switch 245 which controls motor 200. Motor 231 starts when a starting switch 267 is closed and stops by the opening of a stop switch 268 or by opening either of the overload circuit breakers 269. The connection of coil 256 of relay 255 with transformer secondary coil 252 is controlled by a safety switch 270 and by a switch in series therewith and provided by a counter 271 (available on the market) which is provided with a switch which automatically opens when the counter has counted to a certain number. The operation of the counter is controlled by the shaft 222 which, as shown in Figs. 50-52, rotates a rod 272 counterclockwise into engagement with a pin 273 carried by a lever 274 which operates the counter. As lever 274 is moved clockwise by rod 272, the pin 273 moves out of the path of movement of rod 272 whereupon a spring provided by the counter returns the lever 274 to normal position. For each rotation of shaft 222, the counter adds two. When the counter has counted to a certain number, a counter controlled switch (not shown) opens and the coil 256 of relay 255 is open-circuited and solenoid 238 is deenergized to permit the spring 232 to disengage the clutch 226 and the solenoid 257 is deenergized to cause the valve 258 to connect with drain or tank 207. Pressure in a pipe 280, connected with valve 208 (Fig. 44) is relieved, thereby causing valve 208 to connect the outlet of pump 201 with the tank so that the pump 201 will operate without forcing the fluid into the pipe 210. The outlet of pump 202 also is connected through a by-pass controlling valve 281 and a flow-controlling valve 282 with a pipe 283. Whenever valve 258 opens, valve 281, like valve 208, is conditioned for connecting the outlet of pump 202 with the drain. In Figs. 43 and 44 the return to drain is indicated by T.

The function of valve 211 is to connect pipe 210 with a flexible pipe 285 connected with a head end of cylinder 24, thereby causing the tubing to be clamped to the feed slide and the valve 211 operates at the proper time to relieve the pressure in pipe 285 so that the spring 26 will retract the movable clamping member 27 (Fig. 23).

The function of valve 212 is to connect pipe 210 with one or the other of pilot pressure pipes 212a, 212b so that a valve 286 is conditioned to connect pipe 210 either with a pipe 287 or a pipe 288 connected with the ends of the feed cylinder 6. If pipe 287 is connected with pipe 210, pipe 288 will be connected with drain pipe 289 of valve 286, and vice versa.

The function of valve 213 is to connect pipe 210 with one or the other of pilot pressure pipes 213a, 213b for conditioning a valve 290 (Fig. 43) to connect pipe 283 with a pipe 291 or with a pipe 292 connected with cylinder 180. If pipe 291 is connected with pipe 283, pipe 292 is connected with pipe 293 of valve 290 leading to drain, and vice versa.

The function of valve 215 is to connect pipe 210 with one or the other of pilot pressure pipes 215a, 215b (Fig. 44) for conditioning valve 295 to connect pipe 283 with pipe 296 or with pipe 297 connected with cylinder 63. If pipe 283 is connected with pipe 296 by valve 295, pipe 297 is connected with drain pipe 298 of valve 295, and vice versa.

The function of valve 214 is to connect pipe 210 with one or the other of pilot pressure pipes 214a, 214b to condition valve 300 to connect pipe 283 either with pipe 301 or pipe 302 connected with cylinder 150. If pipe 283 is connected with pipe 301, pipe 302 will be connected with drain pipe 304 of valve 300, and vice versa. When valve 300 connects pipe 283 with pipe 302, the piston 149 moves in the direction to connect shafts 131 and 141 (Fig. 33) and to cause plate 122 to be disconnected from the gear 126 preparatory to orbital rotation of rolls A around rolls B. Therefore, it is necessary that support 59 be up and support 60 be down, as shown in Fig. 33. Therefore, concurrently with the admission of pressure fluid to the pipe 302 pressure fluid is admitted through a pipe 305 to the head end of piston 67 and to the rod end of piston 68, thereby causing supports 59 and 60 to move into positions shown in Fig. 33. When valve 300 connects pipe 283 with pipe 301 for the purpose of disconnecting shafts 131 and 141 so that rolls B can move orbitally around the axes of rolls A, pressure fluid is admitted through pipe 306 through the rod end of the cylinder 67 and the head end of cylinder 68 so that support 59 will move down and support 60 will move up to the positions shown in Fig. 36.

Fig. 54 shows the timing of the valve operation for one clockwise revolution of shaft 222 and the five cams shown in Figs. 45–49, their follower F being shown on the same side of the cams for convenience in following timing diagrams as shown in Fig. 54. Since the followers of cams 217 and 219 are located on the side opposite the followers of cams 216, 218 and 220, cams 217 and 219 are actually inverted from the position shown in Figs. 46 and 48. The cycle may be considered as starting with the followers F about 15° from vertical as viewed in Figs. 45–49.

Between 5° and 15°, valve 211 is conditioned to cause clamping of the tubing. Between 11° and 21°, valve 212 is conditioned to cause the tubing T to be fed between rolls A and B as indicated in Fig. 1. Between 27° and 37° valve 214 is conditioned to cause shafts 131 to be coupled with shaft 141, and shaft 141 to be unlatched from gear 126. After feeding the tubing and between 56° and 60°, valve 213 is conditioned to cause rolls A to move to A' in Fig. 2, to effect the lefthand bending of tubing T. Between 126° and 136°, valve 211 is conditioned to cause unclamping the tubing which actually takes place before the feeder retracts in response to conditioning of valve 212 between 131° and 141°. Between 126° and 136°, valve 213 is conditioned to cause roll A to return to normal position as shown in Fig. 3.

Between 177° and 187°, valve 211 is conditioned to cause clamping of the tubing. Between 183° and 193° valve 212 is conditioned to cause the tubing to be fed as indicated in Fig. 4, and valve 214 is conditioned to cause shafts 131 to be uncoupled from shaft 141 and shaft 141 to be latched to gear 126. After feeding the tubing and between 228° and 238°, valve 215 is conditioned to cause movement of roll B to position B' indicated in Fig. 5 to effect right-hand bending of the tubing. Between 304° and 314°, valve 215 is conditioned to cause return of roll B to normal position as shown in Fig. 6.

Reversal of shaft couplings is accompanied by reversal of position of supports or sockets 109 and 110.

Operation of the machine continues until the counter 271 (Fig. 44) "times out," or counts from zero to a number at which the counter is set to cause its switch to open. When this switch opens relay coil 256 (Fig. 43) is open circuited. Relay switch 255 opens, the solenoid 238 is deenergized and the clutch 226 (Fig. 50) disengages. The solenoid 257 is also deenergized and valve 258 causes vent pipe 280 to be opened and valves 209 and 281 open by-passes so that the pumps 201 and 202 run idle. The tubing is removed and the tubing guide is loaded. The counter is reset to the desired number above zero which operation causes counter controlled switch to close. The relay switch 255 closes and solenoid 238 is energized to engage clutch 226 and solenoid 257 is energized to cause valve 258 to close vent 280 and valves 209 and 281 close the pump by-passes.

If the counter is set to count up to an even number, such as 16, the counter switch will open upon the completion of eight revolutions of shaft 222 which causes eight complete machine cycles to produce 16 bends in the tubing. If an odd number of bends, such as 15, is desired, the counter is set at 15 so that the counter switch opens upon the completion of 7½ revolutions of shaft 222 which causes 7½ complete machine cycles. In the case of an odd number of bends, if the first bend in a group of pieces of tubing is left-hand, the last bend before the machine stops will be left-hand. In the next group of pieces of tubing, the first and last bends will be right-hand and in the following group of pieces of tubing the first and last bends will be left-hand. Alternate groups of pieces of tubing having an odd number of bends are inverted when stacking them with the others so that their projecting terminal portions will be substantially aligned.

While the embodiment of the present invention as herein disclosed, constitutes a preferred form, it is to be understood that other forms might be adopted.

What is claimed is as follows:

1. A machine for bending tubing into serpentine shape comprising a pair of grooved rolls, parallel rods on which the rolls are respectively journaled, a support to which the rods are attached and which so spaces the rods that the grooves of the rolls combine to form openings into which the tubing closely fits, rotators respectively in axial alignment with the rods, devices respectively for effecting the turning of the rotators in opposite directions from normal position and return to normal position, means for effecting the coupling of one rotator with the rod support and the uncoupling of the other rotator from the rod support whereby, during the turning of the coupled rotator, the rod not aligned with that rotator will move orbitally about the axis of the rod aligned with that rotator, and vice versa, means for retaining in fixed position the portion of tubing leading to the rolls, and means for longitudinally feeding a certain amount of tubing between the rolls prior to bending operations.

2. A machine according to claim 1 in which the rod support is connected with a shaft, axially aligned with one of the rods and normally axially aligned with one of the rotators, in which said shaft is journaled in a bearing provided by the other rotator and in which coupling of the rotator first mentioned with the rod support is effected by connection of that rotator with the shaft.

3. A machine according to claim 1 in which there is a fixed plate which provides a bearing in which one of the rotators is journaled, in which a second plate attached to the first plate provides a bearing in which the other rotator is journaled, said other rotator being disposed between the plates and carrying the rod support, in which there is a shaft in alignment with one of the rods and normally in alignment with the first-mentioned rotator and rotatably supported by the second rotator and in which coupling of the rotator first mentioned with the rod support is effected by connection of that rotator with the shaft.

4. Apparatus for bending a length of tubing into serpentine form comprising a pair of grooved rolls, parallel rods pivotally supporting the rolls in fixed spaced relation sufficient to admit tubing between them, means for feeding a portion of the tubing between the rolls in a direction at right angles to the plane of the axes of the rods, means for holding straight that unfed portion of the tubing adjacent the rolls, a plate which supports the rods, two rotator members rotatable on axes which are respectively axially aligned with the rods, coupling devices respectively operable to connect the plate with said rotators for rotation therewith, mechanisms respectively operative to rotate the rotators in opposite directions from normal angular position and to return the members to normal angular position, a coupling controller movable in one direction to effect coupling by one coupling device and discoupling by the other coupling device and vice versa by movement of the coupling controller in the reverse direction, and controls for causing, in sequence, operation of the tube feeder, operation of the coupling controller in one direction to cause the coupling of the plate with that rotator next to move and the uncoupling of the plate from the other rotator, operation of the rotator rotating mechanism associated with the then coupled rotator to effect tube bending and return of that rotator to normal angular position, operation of the tube feeder, the movement of the coupling controller in the opposite direction and operation of the other rotator rotating mechanism associated with the then coupled rotator to effect tube bending and return of that rotator to normal angular position.

5. Apparatus according to claim 4 having a rotary table which supports the bent tubing and means for transmitting motion from the rotator-rotating mechanisms to the table only during that portion of the operation of said mechanisms in which tubing is bent.

6. Apparatus according to claim 4 further characterized by bending rolls having a plurality of grooves for receiving a plurality of lengths of tubing which are simultaneously bent, by the provision of rod supports, providing rod-receiving recesses in alignment with the rods and mechanisms which respectively control the positions of the supports either to advance the supports to receive the ends of the rods and to retract them, the controls being further characterized by the provision of means for causing one support controlling mechanism to advance a support to receive that rod which is coupled with the rotator next to move and the other support controlling mechanism to retract the other rod support and for causing reversal of movements of the rod supports when the couplings are reversed.

7. Apparatus for bending a length of tubing into serpentine form comprising a pair of grooved rolls, parallel rods pivotally supporting the rolls in fixed spaced relation sufficient to admit tubing between them, means for feeding a portion of the tubing between the rolls in a direction at right angles to the plane of the axes of the rods, means for holding straight that unfed portion of the tubing adjacent the rolls, a plate which supports the rods, a shaft coaxial with one of the rods and connected with the plate, a rotator supported for rotation on an axis aligned with the axis of the other rod and providing a bearing for the first shaft, a latch for coupling the plate to said rotator, a second rotator or shaft aligned with the first shaft, coupling members provided by the adjacent ends of said shafts, means for longitudinally moving the second shaft to couple it with the first shaft upon longitudinal movement of the second shaft in one direction, means provided by the second shaft when so moved to retract the latch from its coupling position, longitudinal movement of the second shaft in the opposite direction resulting in uncoupling the shafts and the coupling of the plate to the first-mentioned rotator by the latch, mechanisms respectively operative to rotate the rotators in opposite directions from normal angular position and to return them to normal angular position, and controls for causing, in sequence, operation of the tube feeder, operation of the longitudinal moving means of the second rotator or shaft to move it in the direction to couple the shafts and retract the latch, operation of the means for rotating the second rotator or shaft in one direction and return to normal position, operation of the tube feeder, operation of the longitudinal moving means of the second shaft to move it in the direction to uncouple it from the first shaft and to permit movement of the latch to couple the plate with the first mentioned rotator, and operation of the means for rotating the first-mentioned rotator in one direction and return to normal position.

8. Apparatus for bending a length of tubing into serpentine form comprising means for bending the tubing alternately in opposite directions, means for feeding the tubing at intervals between the bending operations, a rotatable table for supporting the tubing as it is bent, means for moving the table in the same directions that the tubing is bent and means for retarding movements of the table during the latter portions of its movement in either direction.

9. Apparatus for bending a length of tubing into serpentine form comprising means for bending the tubing alternately in opposite directions, means for feeding the tubing at intervals between the bending operations, a rotatable table for supporting the tubing as it is bent, means for moving the table in the same directions that the tubing is bent, a motion retarder having a movable member which has freedom of motion in one direction and braked motion in the other direction and a mechanism connecting the member with the table and causing the movable member to move in its first mentioned direction during about the first half portion of the movement of the table in either direction and causing the movable member to move in its second mentioned direction during the remaining portion of the movement of the table in either direction.

JOHN W. ARMSTRONG.
BERNARD E. FRANK.

REFERENCES CITED

The following references are of record in the file of this patent:

UNITED STATES PATENTS

| Number | Name | Date |
|---|---|---|
| 1,676,215 | Frentzel | July 3, 1928 |
| 1,873,939 | Mason | Aug. 23, 1932 |
| 2,331,294 | Bank | Oct. 12, 1943 |
| 2,453,868 | Shaw | Nov. 16, 1948 |